(12) United States Patent
Bublath et al.

(10) Patent No.: US 7,500,833 B2
(45) Date of Patent: Mar. 10, 2009

(54) METHOD FOR REPAIRING A COMPONENT OF A TURBOMACHINE

(75) Inventors: Boris Bublath, Berlin (DE); Beate Heimberg, Haltern (DE); Wolfgang Hermann, Mülheim an der Ruhr (DE); Michael Ott, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 407 days.

(21) Appl. No.: 10/586,231

(22) PCT Filed: Jan. 17, 2005

(86) PCT No.: PCT/EP2005/000406

§ 371 (c)(1),
(2), (4) Date: Jul. 18, 2006

(87) PCT Pub. No.: WO2005/070613

PCT Pub. Date: Aug. 4, 2005

(65) Prior Publication Data

US 2008/0229567 A1    Sep. 25, 2008

(30) Foreign Application Priority Data

Jan. 27, 2004    (EP) .................... 04001723

(51) Int. Cl.
*F01D 5/14* (2006.01)
(52) U.S. Cl. .............. 416/241 B; 29/889.1; 29/402.09; 29/402.11

(58) Field of Classification Search ............ 416/228, 416/241 B; 29/889.1, 402.9, 402.11
See application file for complete search history.

(56) References Cited

U.S. PATENT DOCUMENTS

| 4,141,127 | A | * | 2/1979 | Cretella et al. ........... 29/889.1 |
| 5,444,911 | A | | 8/1995 | Goodwater et al. |
| 5,522,134 | A | * | 6/1996 | Rowe et al. ............. 29/889.1 |
| 6,575,702 | B2 | * | 6/2003 | Jackson et al. ........... 416/96 R |
| 2002/0182362 | A1 | | 12/2002 | Stowell et al. |
| 2003/0196305 | A1 | | 10/2003 | Kebbede et al. |

FOREIGN PATENT DOCUMENTS

| EP | 1 063 210 A1 | 12/2000 |
| EP | 1 251 191 A1 | 10/2002 |

* cited by examiner

*Primary Examiner*—Ninh H Nguyen

(57) ABSTRACT

The invention relates to a method for repairing a damaged and/or aged component of a turbomachine, which is made at least in part of a ceramic composite material. The aim of the invention is to create a method which allows the downtime of the turbomachine caused by damaged components to be reduced while making it possible to repair damaged components. The abovementioned aim is achieved by a generic method for repairing a damaged component (1) of a turbomachine made of a ceramic composite material (4), comprising the following steps: the joint of the component is dissolved; the matrix (5) is extracted and/or the component is machined; infiltration to restore and/or renew the ceramic matrix (5) of the component; and the joint is re-established.

16 Claims, 5 Drawing Sheets

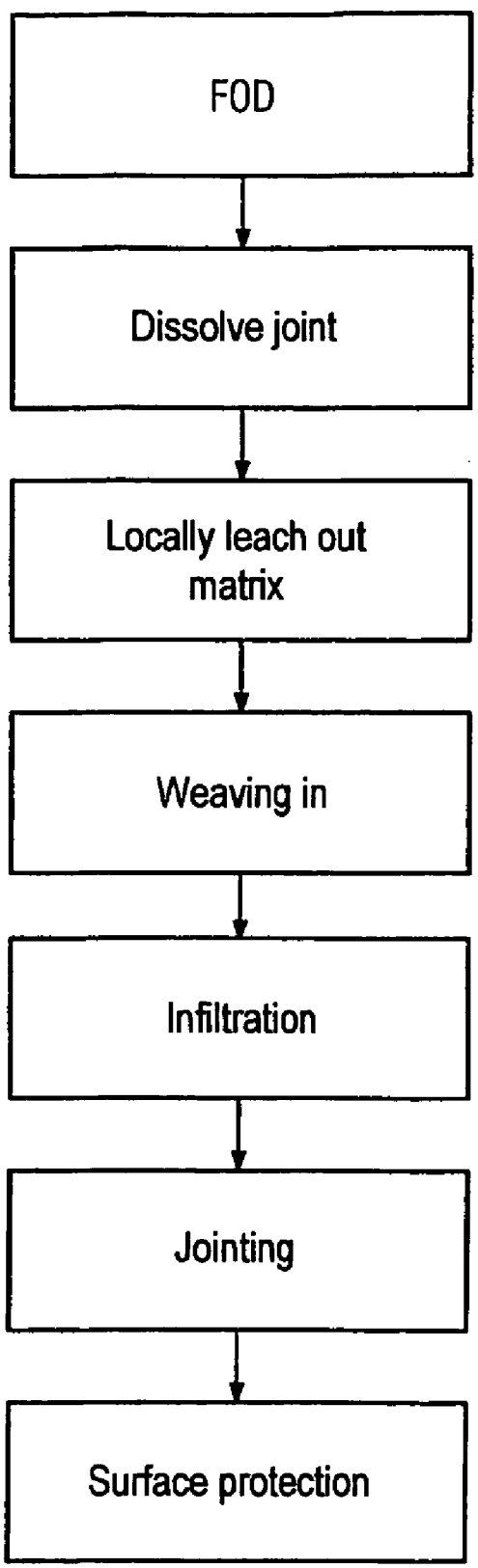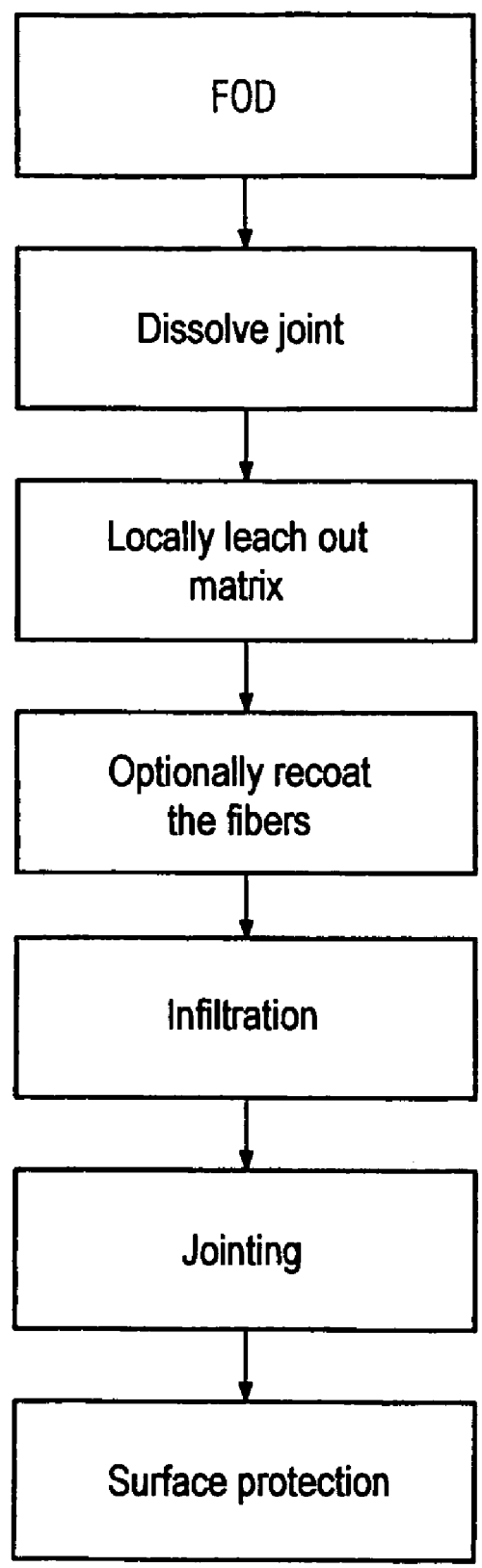

ns. 17, 2005

METHOD FOR REPAIRING A COMPONENT OF A TURBOMACHINE

CROSS REFERENCE TO RELATED APPLICATIONS

This application is the US National Stage of International Application No. PCT/EP2005/000406, filed Jan. 17, 2005 and claims the benefit thereof. The International Application claims the benefits of European Patent application No. 04001723.8 filed Jan. 27, 2004. All of the applications are incorporated by reference herein in their entirety.

FIELD OF THE INVENTION

The present invention relates to a method for repairing a damaged and/or aged component of a turbomachine which is at least partially made of a composite ceramic material.

BACKGROUND OF THE INVENTION

Turbomachines, for example steam or gas turbines, compressors or the like, have components particularly in their flow channel which are exposed to high physical and chemical stresses during operation of the turbomachine. Such components are particularly guide vanes and rotor blades, but also wall elements which form the flow channel or clad it. Particularly in gas turbines, the components exposed to hot gas experience a multiplicity of effects during normal operation, the instance due to corrosive media, an oxidizing atmosphere, high temperatures or foreign bodies. This can cause the components to become damaged or suffer ageing.

For stringent requirements of the components, for example those in gas turbines, it is intended that these components should be made of composite ceramic materials which, for example, may be formed by a composite of ceramic and metal, or different ceramic materials. In order to be able to meet the stringent requirements during operation of the turbomachine and in order to be able to achieve a high efficiency, components made of composite ceramic materials, particularly combinations of different ceramic materials, are increasingly used more and more in the prior art. In order to improve the typically brittle fracture behavior, one ceramic material i.e. the matrix material is inlaid with a further material having a different structure than the matrix. An increased resistance to external effects can be achieved i.e. small faults in the material, for example generated during production or by stress in operation, do not lead directly to damage of the components. In order to improve the properties of the composite materials, it is known to provide particle reinforcement, for example whisker reinforcement. In such ceramics, however, it is necessary to ensure that the short fibers i.e. whiskers remain bound in the ceramic matrix during normal operation, since these are assigned to a high hazard class because they can enter the lungs. Preferably long fibers have therefore been used to date, which are made of glass or glass ceramic comprising e.g. SiC, $Al_2O_3$, C, BN or $Si_3N_4$ or a combination of these. If damage to such a component then occurs, it has previously been customary to turn off the turbomachine and replace the damaged component. Otherwise, it is to be feared that the damaged component may cause further worse damage to the turbomachine which can entail enormous repair outlay and a long downtime.

The replacement of a defective component may lead to a long downtime, particularly if the component is not available from store. A further undesirable effect of replacement is that the components of the turbomachine will have different ageing states. During later routine maintenance, components that could still withstand a subsequent operating cycle might then be replaced.

US 2003/0196305 A1 discloses a method for repairing ceramic composites, in which the site to be repaired is filled layer-wise with fiber-reinforced bands. There are consequently no fiber junctions between the individual bands, so that the bands have a poor mechanical bond between them.

Further prior art is known from US 2002/018236 A1, EP 1 251 191 A1, U.S. Pat. No. 5,444,911 and EP 1 063 210A1.

SUMMARY OF THE INVENTION

It is therefore an object of the present invention to provide a method which makes it possible to reduce the downtimes of the turbomachine due to damaged components, and to provide a way of repairing damaged components.

To achieve this, the present invention relates to a method for repairing a damaged component of a turbomachine made of a composite ceramic material, which comprises the following steps: dissolving the joint of the component, leaching out the matrix and/or mechanically processing the component, infiltration to restore and/or renew the ceramic matrix of the component and restoring the joint.

The invention for the first time provides a way of repairing a ceramic composite material component of a turbomachine, and particularly components which are exposed to hot gas. Separation of the joint thus makes it possible to disassemble the component, which has been jointed together by adhesive technology or sintering technology. It is therefore possible to reveal the damaged part of the component and make it readily accessible for further processing. In a following step, the matrix of the damaged part of the disassembled component is leached out or mechanically processed. By leaching, the operationally stressed parts of the matrix of the ceramic composite material can be dissolved without damaging the fiber structure. The leaching may be achieved by the effects of a fluid substance such as a suitable gas or a suitable liquid. The damaged region may furthermore be processed by an operation in which material is removed, for example grinding, milling or the like. The damaged region can thus be excavated so as to form a basis for a repair. In a following step, infiltration is carried out in order to restore and/or renew the ceramic matrix of the component. The ceramic matrix can thus be locally reconstructed. The infiltration may, for example, take place from a gas or liquid phase. To this end, the site to be infiltrated is exposed to a suitable fluid. Nevertheless, it is also possible to perform polymer infiltration in order to carry out the infiltration step. The component is subsequently reassembled by jointing. The restoration of the joint may also be used directly as a repairing or filling method. The outer contour of the damaged component can thereby be restored, for example in order to guarantee its fluid-dynamic properties. A particular advantage is that replacement components, which are generally very cost-intensive, do not have to be stocked. The logistics for storing and manufacturing replacement components can be reduced. The method according to the invention thus allows rapid and cost-effective restoration of the function of the turbomachine, particularly outside the intended maintenance intervals, so that it is possible to reduce downtimes due to the repair.

After the step of dissolving the joint, according to a further configuration, the component is decoated before further processing. This advantageously makes it possible to repair local damage and/or detachment of oxidation or corrosion protection. For example, the decoating may be provided in order to offer access to the region of the component damage for leaching out and reincorporating the matrix by infiltration and subsequent pyrolysis. It is furthermore possible to avoid problems, in particular obstruction, due to the coating during the component repair according to the invention.

According to a refinement of the present invention, weaving and/or recoating of the fibers is carried out before the infiltration step. A structure forming the composite material can be restored by inserting individual fibers or prefabricated woven plates such as mats, network structures or the like. Local reconstruction can furthermore be facilitated while achieving improved mechanical properties compared to the ceramic matrix. Extra stability can be achieved compared to pure filling exclusively with ceramic compound. The fibers, mats or network structures may be made of a non-oxidic material such as silicon carbide, carbon or another ceramic material, in particular an oxidic material.

It is furthermore proposed that the component should be sintered before the step of restoring the joint. The sintering can be achieved cost-effectively by means of known sintering methods such as laser sintering, plasma sintering or the like.

In order to be able to carry out the sintering when the component is in the installed state in a gas turbine, it is proposed that the gas turbine should be temporarily overfired. Overfiring the gas turbine makes it possible to bind the ceramic matrix on the component installed in the gas turbine. The sintering can thus be carried out particularly advantageously when the component is in the installed state.

It is furthermore proposed that the component should be coated before the step of restoring the joint. An extension of the oxidation or corrosion protection can thus be achieved for the component.

It is furthermore proposed that surface protection should be provided after the step of restoring the joint. The surface protection can be produced by CVD, PVD or plasma spraying methods. It is preferable for the surface protection to be provided for the entire component and thus also to cover the positions where the component is jointed. A high reliability of the component can be achieved.

In a further configuration, it is proposed that the method for repairing a damaged component of a turbomachine, which is at least partially made of a composite ceramic material, should comprise the following steps: leaching out the matrix and/or mechanically processing the component, infiltration to restore and/or renew the ceramic matrix of the component, and sintering the component. Compared to the aforementioned method according to the invention, this method is distinguished in that it is suitable particularly for repairing a damaged component in the installed state in the turbomachine. Besides the aforementioned advantages, it is also possible to further reduce the outlay for assembly.

It is furthermore proposed that weaving and/or recoating of the fibers should be carried out after the step of leaching out the matrix and before the infiltration step. This alternative method according to the invention can also achieve an improvement of the mechanical properties compared to the pure ceramic matrix. This method furthermore makes it possible for a fiber structure already present to be likewise repaired.

BRIEF DESCRIPTION OF THE DRAWING

Other features and advantages can be found in the following description of exemplary embodiments. Components and method steps which are the same are denoted by identical references. The exemplary embodiments serve merely to explain the invention and are not intended to restrict it.

FIG. 5 shows a method according to the invention for repairing a component extracted from a gas turbine, with the production of subsequent surface protection, FIG. 6 shows a method for repairing a component with coating of the fibers and surface protection.

DETAILED DESCRIPTION OF THE INVENTION

Figure 1:
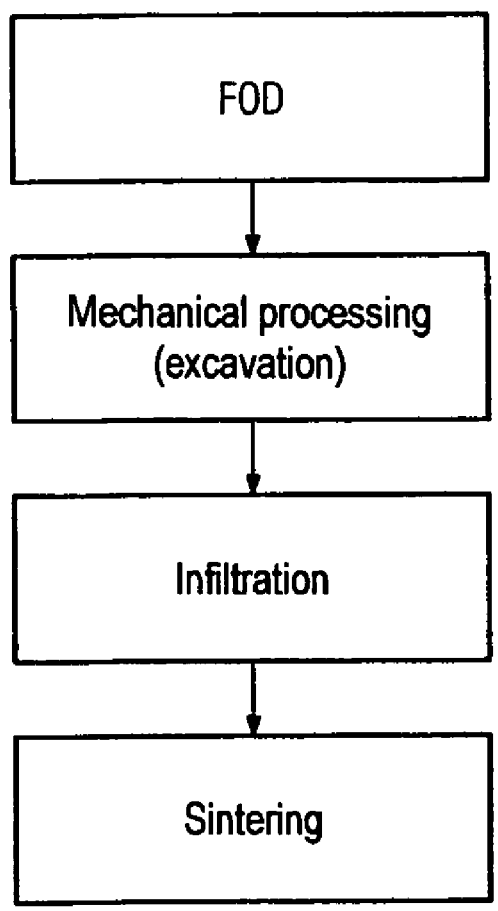
FIG. 1 shows a first configuration of a method according to the invention for repairing a component which is installed in a gas turbine and has been damaged by the effect of foreign bodies.
Figure 7:
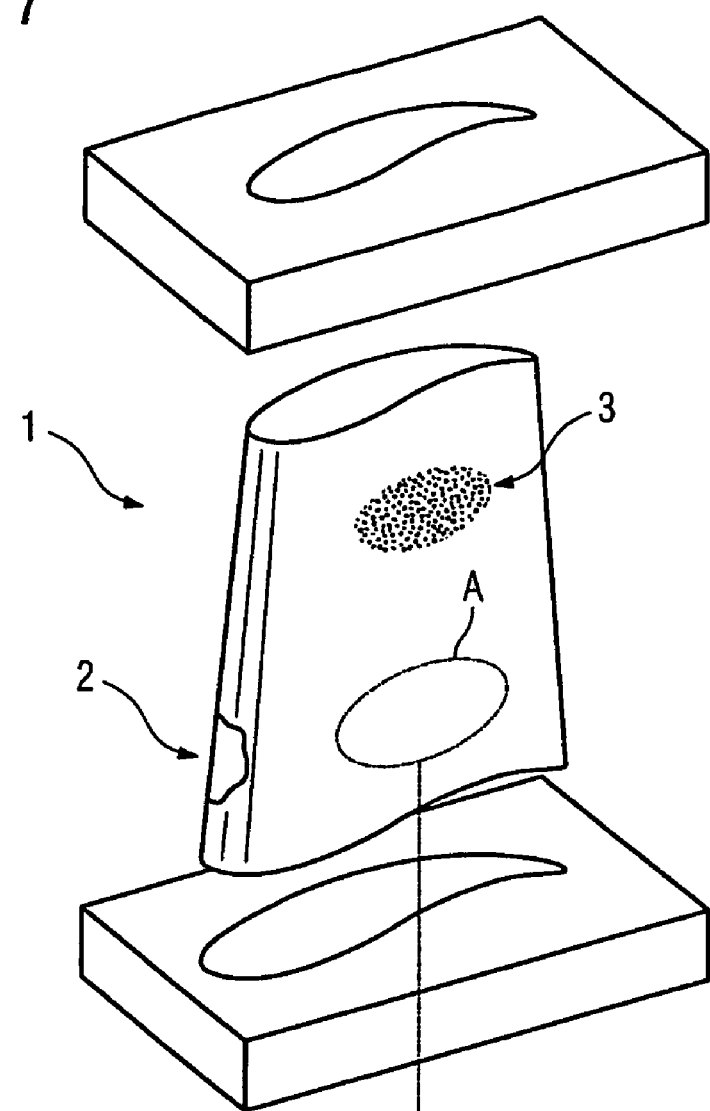
FIG. 7 shows a schematic representation of a ceramic composite material rotor blade of a gas turbine with damage.

FIG. 1 shows a first method according to the invention for repairing a guide vane 1 (FIG. 7) of a gas turbine (not represented in further detail), which has been damaged during operation in the gas turbine. The guide vane 1 presented here consists of a ceramic material, for example silicon nitrite, silicon carbide, aluminum oxide, zirconium oxide, mullite, glass, glass ceramic and/or the like. This material is conventionally referred to as a matrix. In order to improve the brittle fracture behavior, the matrix material is provided with fiber reinforcement which, for example, may consist of glass, glass ceramic, silicon carbide, silicon nitrite or the like, as well as a combination of these, so that a quasi-plastic deformation behavior can be achieved. Besides this, instead of or in addition to the fibers, it is also possible to introduce short fibers i.e. whiskers into the matrix. For environmental reasons, however, the first version is preferred. Gas turbines equipped with such vanes allow a high inlet temperature into the turbine region of from 1100° C. to 1350° C., in which case efficiencies of 31%, 40% or more can be readily achieved.

The increase in the fracture toughness of such materials is very essentially based on diverting cracks from their propagation direction on the interface between the matrix and fiber. Energy is thereby dissipated and the further crack formation is reduced. When a fiber cracks, it will be pulled out of the matrix by a tensile stress so that energy dissipation likewise takes place. Stress dislocations then occur, which can be relaxed as in a metal. The fibers themselves may have a coating, for example of carbon or boron nitride. Both oxidic and non-oxidic fibers are used as fiber materials. Non-oxidic fibers comprise carbon fibers, fibers of silicon carbide, silicon nitride and boron nitride as well as SiBNC. On the other hand, oxidic fibers consist essentially of aluminum oxide (sapphire fibers), mullite ($Al_2O_3+SiO_2$) and zirconium oxide. For example, the fibers Hi-Nicalon and Hi-Nicalon S can be obtained from Nippon Carbon or Tyranno. Oxide fibers are furthermore available from 3M under the names Nextel 610 and Nextel 720. In general, matrix materials differ not only according to the materials used but also according to the production method, e.g. glass, silicon dioxide, aluminum oxide, silicon carbide or silicon nitrite being employed as materials.

The wall element (not shown) with the damaged guide vane 1 is extracted from the turbine in the present example and mechanically processed or excavated in a first step, as represented in FIG. 1. This is followed by local reconstruction of the ceramic matrix using infiltration or paste application. The repaired region of the component is subsequently sintered and the wall element with the guide vane 1 is reinstalled at its position in the turbine. Depending on the accessibility of the components inside the turbine, the repair may also be carried out when the component is in the installed state.

Figure 2:
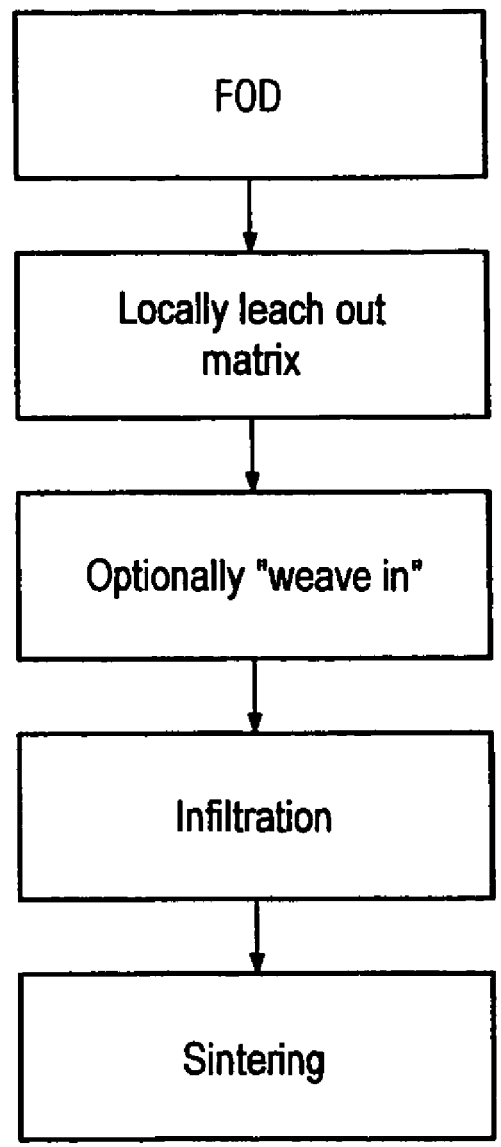
FIG. 2 shows a second method according to the invention for repairing a component installed in a gas turbine.
Figure 8:
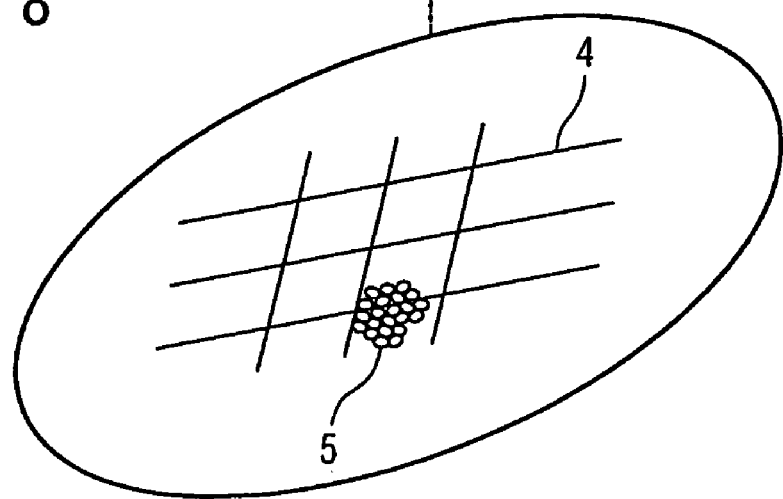
FIG. 8 shows an enlarged detail of the region A in FIG. 7.

Another method is proposed according to FIG. 2, the matrix of the damaged component 1 being leached out locally in a first step (FIG. 8). The fibers are inserted in a further step, in which case it is possible to achieve improved mechanical properties compared to the ceramic matrix 5. The steps of infiltration and sintering are subsequently carried out as in the previous example of FIG. 1.

Figure 3:
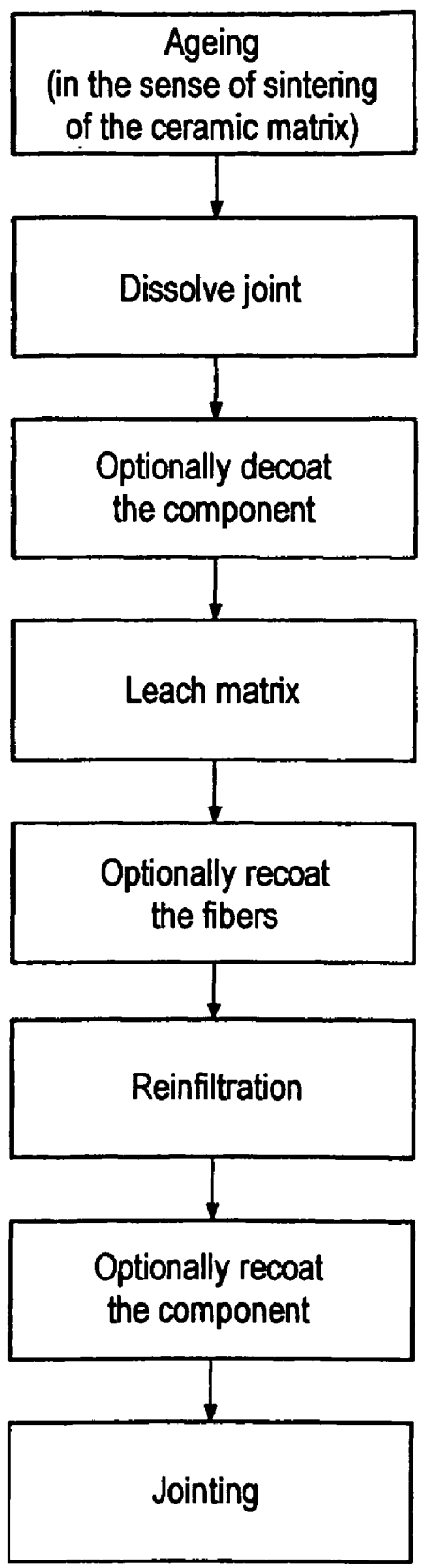
FIG. 3 shows a third configuration of a method according to the invention, for repairing a component extracted from a gas turbine.

FIG. 3 shows a method for removing an ageing effect of the guide vane 1, which has occurred owing to sintering of the ceramic material on the guide vane 1. In order to remove this damage, in a first step the joint is dissolved and the guide vane 1 is subsequently decoated.

The coating 3 of the component conventionally forms a protective layer, which comprises aluminum, silicon and/or chromium depending on the application. On its layer surface facing the flow channel, this protective layer forms a protective oxide skin so that the underlying material is protected from further oxidative attacks. With a progressive operating time, oxygen diffuses out of the flow channel through the protective layer, and thus leads to an increase in the thickness of the oxide skin. In the end, the oxygen reaches the underlying material. The oxide skin splits or tears off because of thermally or mechanically induced stresses, the layer being locally renewed. If the protective layer is depleted with respect to the aforementioned elements, then the oxygen diffuses into the component. The oxides created by this have only a minor protective property, which leads to massive component damage with crack formation.

This coating 3 is removed before the next step. The existing matrix 5 is then leached out and the fibers are recoated. The ceramic matrix 5 is next built up locally by reinfiltration. The guide vane 1 is then recoated and the joint is subsequently restored.

In order to restore the coating, for example, a diffusion layer may be produced and/or a coat layer or support layer may be applied. In the production of diffusion layers by CVD methods (CVD stands for chemical vapor deposition), aluminum and chromium contents are increased in the superficial regions of the component. The "pack cementation" method is conventionally used for this, in which the components at a temperature of about 700 to 1100° C., preferably at a temperature of from 800 to 1050° C., are surrounded in an inert or reducing atmosphere with powders that are enriched with the requisite elements. Via the aluminum content in the powder, it is possible to control whether aluminum diffusion takes place into the component (high activity process) or nickel diffusion takes place out of the component into the powder (low activity process). With a view to hot gas corrosion protection, it is possible to use variants of the pure aluminide (aliting) layers, for example aluminide layers modified with platinum. The diffusion method can be used for a layer thickness preferably up to 100 µm, while support layers can be deposited both more thickly and with a more complex composition. The application of a support layer, however, is carried out by means of thermal spraying methods or the PVD method (PVD stands for plasma vapor deposition). Particularly for use in gas turbines it is known to use alloys of the "MCrAlA" type which, if the match with the operating state is good, guarantee the buildup of a thick passivating oxide skin for more than 1000 hours. M stands for matrix elements, for example nickel, cobalt, iron or the like, and a combination of these elements. Chromium, aluminum or the like are preferably used for the cover layer formation. A stands for active elements such as yttrium, hafnium, zirconium and/or ytterbium or the like. It is also possible to add silicon in order to increase the activity of the cover layer forming agents. Further addition of rhenium reduces the oxidation rate and simultaneously improves the thermomechanical behavior of the system.

Figure 4:
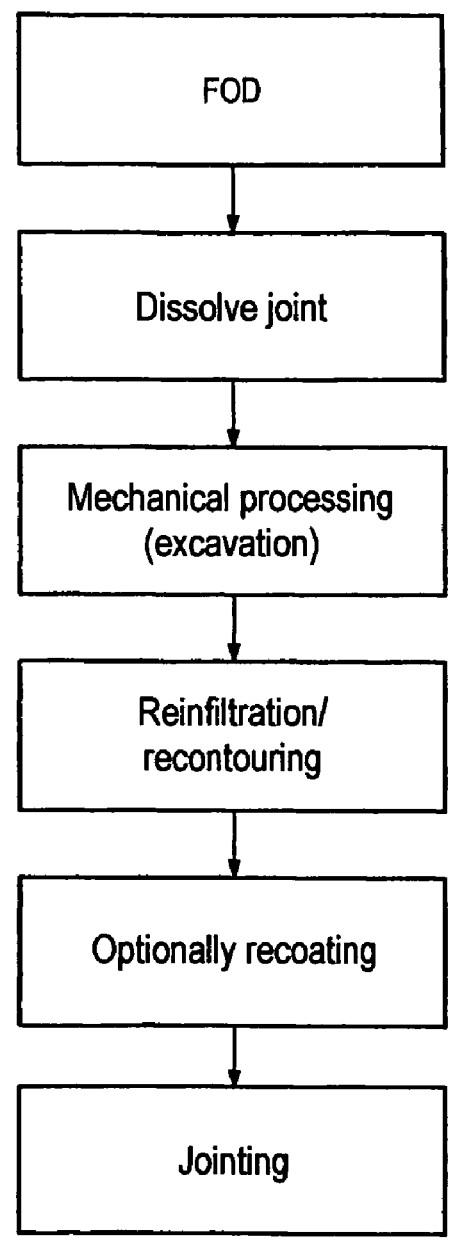
FIG. 4 shows another method according to the invention for repairing a component extracted from a gas turbine.

FIG. 4 shows another method sequence according to the invention in which, in order to repair mechanical damage 2 of the guide vane 1, the joint is first dissolved and then the damaged site is mechanically excavated by grinding. In the following step, by reinfiltration or recontouring, the original shape of the guide vane 1 is restored. The guide vane 1 is then coated and subsequently rejointed.

FIG. 5 represents a method sequence for repairing a guide vane 1 which is damaged by the effect of foreign bodies. The joint is initially dissolved in a first method step, and the matrix 5 is leached out at the relevant sites in a subsequent method step. Individual ceramic fibers 4 are then woven in at the relevant sites. In the present case, the fibers 4 are formed by a ceramic material. The local reconstruction of ceramic matrix 5 is subsequently carried out by infiltration. The guide vane 1 is then jointed and surface protection is applied on the guide vane 1.

Another method sequence according to the invention is represented in FIG. 6, in which recoating of the fibers is provided in contrast to the method sequence represented in FIG. 5.

The exemplary embodiments are merely intended to explain the invention and not restrict it. Other combinations of method steps may be carried out by the person skilled in the art without departing from the protective scope of this invention.

Figure 9:
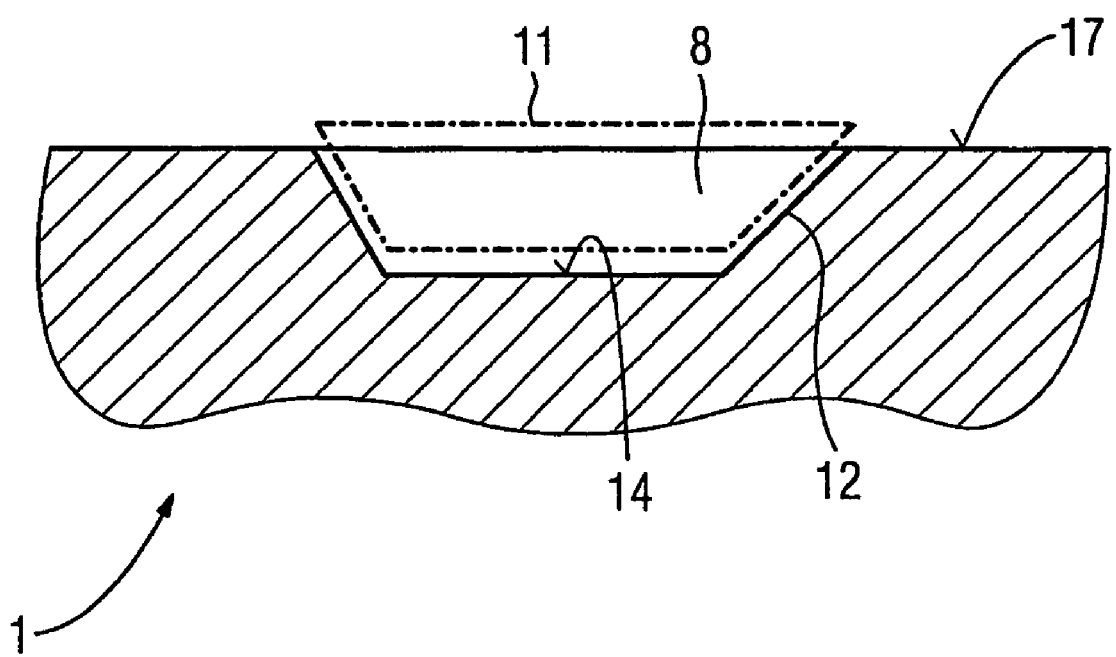
FIG. 9 shows a site to be repaired.

FIG. 9 shows a component, in particular a rotor blade or guide vane 1, with a site 8 to be repaired. The site 8 to be repaired has been treated according to the method described above, and therefore only needs to be refilled. The site 8 to be repaired constitutes an indentation and is filled by an insert 11.

This may, for example, be a block of ceramic fibers or a band applied with an appropriate thickness, which is also infiltrated and further treated as described above. In no case are the individual mats or individual bands inserted above one another here, rather a monobloc insert 11 is inserted which then has a high strength in the filled site to be repaired 8.

The site 8 to be repaired may, for example, be up to 4 mm deep and measure 50×50 mm in area. The edges 12 of the site 8 to be repaired and therefore of the insert 11 are for example designed to converge flatly, so as to obtain a trapezoidal cross section of the site 8 to be repaired, as in FIG. 9. Curved-profile transitions from the bottom 14 of the site to be repaired to the surface 17 are likewise possible.

The invention claimed is:

1. A method for repairing an at least part-composite ceramic turbomachine component, comprising:
dissolving a joint of the component;
mechanically processing the component to prepare a repair site;
renovating a ceramic matrix of the component and restoring the joint; and
filling the repair site with a single monobloc insert that is not a mat or a band and has a high strength where the edges of the repair and the edges of the insert converge flatly.

2. The method as claimed in claim 1, wherein after the dissolving of the joint, the component is decoated before further processing.

3. The method as claimed in claim 1, wherein mechanically processing the component consist of excavating the repair site.

4. The method as claimed in claim 1, wherein the repair site is excavated by grinding.

5. The method as claimed in claim 1, wherein the ceramic matrix is renovated by infiltration of the ceramic matrix.

6. The method as claimed in claim 5, wherein the ceramic matrix is renovated by paste application.

7. The method as claimed in claim 5, wherein weaving or recoating of the fibers is performed before the infiltration of the ceramic matrix.

8. The method as claimed in claim 5, wherein weaving and recoating of the fibers is performed before the infiltration of the ceramic matrix.

9. The method as claimed in claim 1, wherein the component is sintered before the joint is restored.

10. The method as claimed in claim 1, wherein the component is coated before the step of restoring the joint.

11. The method as claimed in claim 1, wherein surface protection is provided to the component after the step of restoring the joint.

12. The method as claimed in claim 1, wherein the turbomachine component is completely formed from a composite ceramic material.

13. A method for repairing a damaged or aged gas turbine component which is at least partially made of a composite ceramic material, comprising:
    leaching out a matrix of the composite ceramic material or mechanically processing the component;
    restoring or renovating the ceramic matrix of the component by infiltration; and
    sintering the component by overfiring the operating gas turbine.

14. The method as claimed in claim 13, further comprising weaving or recoating of fibers of the component before restoring or renovating the ceramic matrix and after leaching out the matrix.

15. A repaired gas turbine component which is at least partially made of a composite ceramic material, comprising:
    a root portion;
    a tip portion opposite the root portion;
    an airfoil section arranged between the root and tip portions;
    a repair section filled with a high strength single monobloc insert that is not a mat or a band where the edges of the repair section and the edges of the insert join smoothly and aerodynamically; wherein a ceramic matrix of the component is restored or renovating by infiltration.

16. The gas turbine component as claimed in claim 15, wherein the component is sintered by overfiring the operating gas turbine.

* * * * *